United States Patent
Inokuchi et al.

[11] Patent Number: 6,134,626
[45] Date of Patent: Oct. 17, 2000

[54] METHOD AND APPARATUS FOR RECORDING DATA USING MULTIPLE BUFFERS

[75] Inventors: Tatsuya Inokuchi; Osamu Udagawa; Shigeki Tsukatani, all of Kanagawa, Japan

[73] Assignee: Sony Corporation, Tokyo, Japan

[21] Appl. No.: 08/959,364

[22] Filed: Oct. 28, 1997

[30] Foreign Application Priority Data

Oct. 31, 1996 [JP] Japan ................................. 8-306966

[51] Int. Cl.[7] ........................................ G06F 12/00
[52] U.S. Cl. ............................ 711/4; 711/112; 711/111
[58] Field of Search ........................... 711/102, 100, 711/112, 4, 111, 154; 369/44.26, 99

[56] References Cited

U.S. PATENT DOCUMENTS

| | | | |
|---|---|---|---|
| 4,672,597 | 6/1987 | Yamazaki | 369/59 |
| 4,704,711 | 11/1987 | Gerard et al. | 369/59 |
| 5,321,824 | 6/1994 | Burke et al. | 711/220 |
| 5,437,012 | 7/1995 | Mahajan | 711/111 |
| 5,440,532 | 8/1995 | Yokogawa et al. | 369/32 |
| 5,559,778 | 9/1996 | Inokuchi et al. | 369/58 |
| 5,563,862 | 10/1996 | Udagawa | 369/54 |
| 5,610,893 | 3/1997 | Soga et al. | 369/84 |
| 5,737,289 | 4/1998 | Udagawa | 395/54 |
| 5,778,257 | 7/1998 | Tsukatani et al. | 395/894 |
| 5,841,598 | 11/1998 | Horiuchi et al. | 360/31 |

OTHER PUBLICATIONS

Application No. 08/713,680, Sep. 17, 1996.
U.S. Patent Application No. 08/887,519, Filed Jul. 3, 1997.

*Primary Examiner*—John W. Cabeca
*Assistant Examiner*—Pierre-Michel Bataille
*Attorney, Agent, or Firm*—Limbach & Limbach, LLP

[57] ABSTRACT

In an information recording method and its device to sequentially write data on a recording medium on a fixed data basis, a command to write the first data formed of the fixed data basis is transmitted from the fixed file system to the writing means of the recording medium, and an actual write result of the first data is returned from the writing means to the file system delaying for the fixed number of commands from the time of transmitting the first data. By inserting link blocks on the data sequence to be recorded on the recording medium and sequentially writing a plurality of packets, the write position shift can be prevented, and by returning an actual write result delaying for the predetermined number of commands, the data writing that is error retrievable using the write cache can be realized.

9 Claims, 18 Drawing Sheets

METHOD AND APPARATUS FOR RECORDING DATA USING MULTIPLE BUFFERS

BACKGROUND OF THE INVENTION

1. Field of the Invention

The present invention relates to an information recording method and its device and is suitably applied to an information recording method and its device to write data on a write once read many (WORM) disc recording medium on a fixed data basis for example.

2. Description of the Related Art

Heretofore, there has been a read only memory disc called as CD-ROM (compact disc-read only memory) as a large capacity data recording medium. The file system exclusively for CD-ROM has been used in this CD-ROM.

There has been a recordable disc shaped recording medium called as CD-R (compact disc-recordable) which enables write once by forming new recording layer on this CD-ROM. In this CD-R, data will be recorded/reproduced using the packet recording file system for the CD-R in place of the file system for the CD-ROM described above.

As a recording method of this kind, as shown in FIG. 1, the file system of the host computer side, after collecting one packet of data at step SP1, moves to step SP2, and as well as sending a write command of the packet to the CD-R drive device side, transmits the data of said packet (write data) to the CD-R drive device side.

At step SP3, the CD-R drive device moves a pickup a little toward this side from the write position designated to the write data transmitted at the step SP2 and starts the reproduction by tracing the recording track from that position.

Then, at step SP4 the CD-R drive device waits until the drive servo of the CD-R disc becomes stable, and moving to step SP5, it makes the signal recorded on the CD-R disc to synchronize with the data to be recorded on the CD-R disc hereafter at an encoder. Then, the CD-R drive device moves to step SP6 and starts encoding faster for the data delay at the encoder, and at step SP7, when the pickup reaches the predetermined write position, the CD-R drive device increases the laser output and writes the write signal supplied from the encoder on the disc. Thus, the CD-R drive device executes the setup at steps SP3–SP7 before starting the actual data writing.

When the data writing is started at the step SP7, the CD-R drive device moves to step SP8, and when completing the encoding for one packet and reaching to the predetermined write stop position, it stops the write function by decreasing the laser output. Thus, the data writing for one packet in the CD-R drive device is completed, and at this moment the CD-R drive device moves to step SP9 and by transmitting the success of said packet writing to the file system, one packet of data writing is completed.

With this arrangement, whenever the data writing for one packet is completed, the CD-R drive device informs the completion of writing to the file system side and as shown in FIG. 2, every time said information is received, the file system collects succeeding one packet of data and repeats steps SP1–SP9 described in FIG. 1.

However, in order to write data per packet on the CD-R disc according to the method described above, the file system starts the processing to collect the succeeding packet data at the time when the write operation of each packet shown in FIG. 2 (steps SP3–SP9) is completed. And thus, the operation of the file system side is suspended during the data writing process at the CD-R drive device side (steps SP3–SP9), and it becomes inevitable that the overall writing operation requires lengthy processing period. Especially, the CD-R disc device has slower seek speed than the hard disc device and since the time needed for setup (steps SP3–SP7) described in FIG. 1 becomes lengthy and during this period the file system is forced to wait for the processing. As a method to solve this problem, the method to send back the write success information using write cache before the actual data writing can be considered. More specifically, in FIG. 3 in which the corresponding parts of FIG. 1 are given the same reference numerals, the file system of the host computer side compiles one packet of write data in the buffer at the step SP1 and sends out the write command and write data of said packet to the CD-R drive device at the step SP2. When the CD-R drive device receives the write command and the write data supplied from the file system side at the step SP2, at the step SP9 before starting to write data, it sends back the write success information of the packet designated to write by said write command (i.e., the write command complete information of said packet) to the file system side. Thus, the processing to collect data of the packet succeeding said packet will be started.

When the CD-R drive device returns the write success information (command complete information) to the file system at the step SP9, it moves to the step SP3 and starts an actual write processing of write data of the packet of which success information is returned ahead of time at the step SP9.

More specifically, at the step SP3, the CD-R drive device moves the pickup toward this side a little from the write position designated and starts reproduction by tracing the recording track from that position.

Then, at the step SP4, the CD-R drive device waits until the drive servo of the CD-R disc becomes stable, and moving to step SP5, synchronizes the signal recorded on the CD-R disc with the data to be recorded hereafter on the CD-R disc at the encoder. Then, the CD-R drive device moves to the step SP6 and starts encoding faster for the data delay at the encoder, and at the step SP7, when the pickup reaches to the predetermined write position, increases the laser output and writes the write signal supplied from the encoder on the disc. Thus, when the setup of steps SP3–SP7 has been completed, data writing will be started, and moving to the step SP8, the CD-R drive device completes encoding for one packet and when reaching to the write stop position, it stops the write operation decreasing the laser output. Thus, the data writing for one packet in the CD-R drive is completed.

With this arrangement, by executing the processing of step SP9 before the setup of steps SP3–SP7 is conducted and sending back the write success information of the packet of which write process has not been started to the file system side, the file system can start the processing to compile data of the packet succeeding the packet on which said write processing is conducted before the completion of actual writing (i.e., before setup) at the step SP8.

The method to record data sequentially on the CD-R disc in utilizing the write cache process can be considered. More specifically, as shown in FIG. 4A, the file system of the host computer side compiles data sequentially on a packet-by-packet basis using the write cache process described above in FIG. 3 to the buffer memory of the CD-R drive device side. At this time the buffer memory of the CD-R drive device writes said data on the CD-R disc sequentially until the stored data would be used up, and as shown in FIG. 4B, when the data in the buffer memory is gone, writes run out information RO1 and RO2 showing the completion of the packet making the data written on the CD-R disc as one packet and completes the data writing. Thus, the writing method which writes data for one data track sequentially as shown in FIG. 5, the so-called track at once, can be considered.

However, if the write cache shown in FIG. 3 is used on the file system side, write success information is sent back from the CD-R drive device to the file system of the host computer before the write data is actually completed, and accordingly, the file system side starts preparation for the next packet destroying the data before the completion of write data. Therefore, if the actual write data is failed, the restoration of data becomes difficult.

Furthermore, as shown in FIG. 4, in the case where the CD-R drive device side forms variable length packets by successively conducting the write data until data in the buffer memory is used up, the length of said write packet to be written actually on the CD-R disc depends on the data volume of the buffer memory of the CD-R drive device and it is difficult to recognize the length of said packet in the file system of the host computer side. When the variable length packet formed on the CD-R disc is completed, the complete information, so-called lead out, is written on the edge of said packet and simultaneously, when the following packet data writing is started, link block showing the border of packets and lead in information of 4 blocks showing the packet starting information are written. Accordingly, in the case where the packets are completed corresponding to the data volume of the buffer memory of the CD-R drive device side, the write position of the following packet shifts for ring block and the preceding and succeeding lead out block and lead in block, that is address shift occurs. This address shift can be hardly recognized by the file system side and as a result, the difference existed between the write address to be recognized on the file system side and the address in which actually data is written.

SUMMARY OF THE INVENTION

In view of the foregoing, an object of the present invention is to provide an information recording medium and its device capable of conducting the write error recovery as well as avoiding the occurrence of address shift and further decreasing the time needed for the write processing.

To obviate such problems according to the present invention, in the information recording method for writing data on the recording medium on a fixed data basis, after transmitting the write command to write the first data on a fixed data basis on the recording medium from the prescribed file system to the writing means of the recording medium, as well as sending back the actual writing result of the first data delaying the fixed number of commands from said writing means to the file system, the command completion result of the first data will be sent back from the write means to the file system before the completion of the first data writing after transmitting the write command of the first data from the file system to the writing means.

Furthermore, according to the present invention, a plurality of buffers are provided in the file system side and sequential data on a fixed data basis are prepared alternately and said prepared data will be written on the recording medium.

According to the present invention, by terminating the write command immediately before the actual writing, while storing the data in the process of actual writing in the buffer of one side, the following data can be prepared in the buffer of the other side. Thus, it makes possible to recover the write error and at the same time, data can be sequentially written on the recording medium. Thus, the time required for the overall data writing process can be shortened.

The nature, principle and utility of the invention will become more apparent from the following detailed description when read in conjunction with the accompanying in which like parts are designated by like reference numerals or characters.

DETAILED DESCRIPTION OF THE EMBODIMENT

Figure 6:
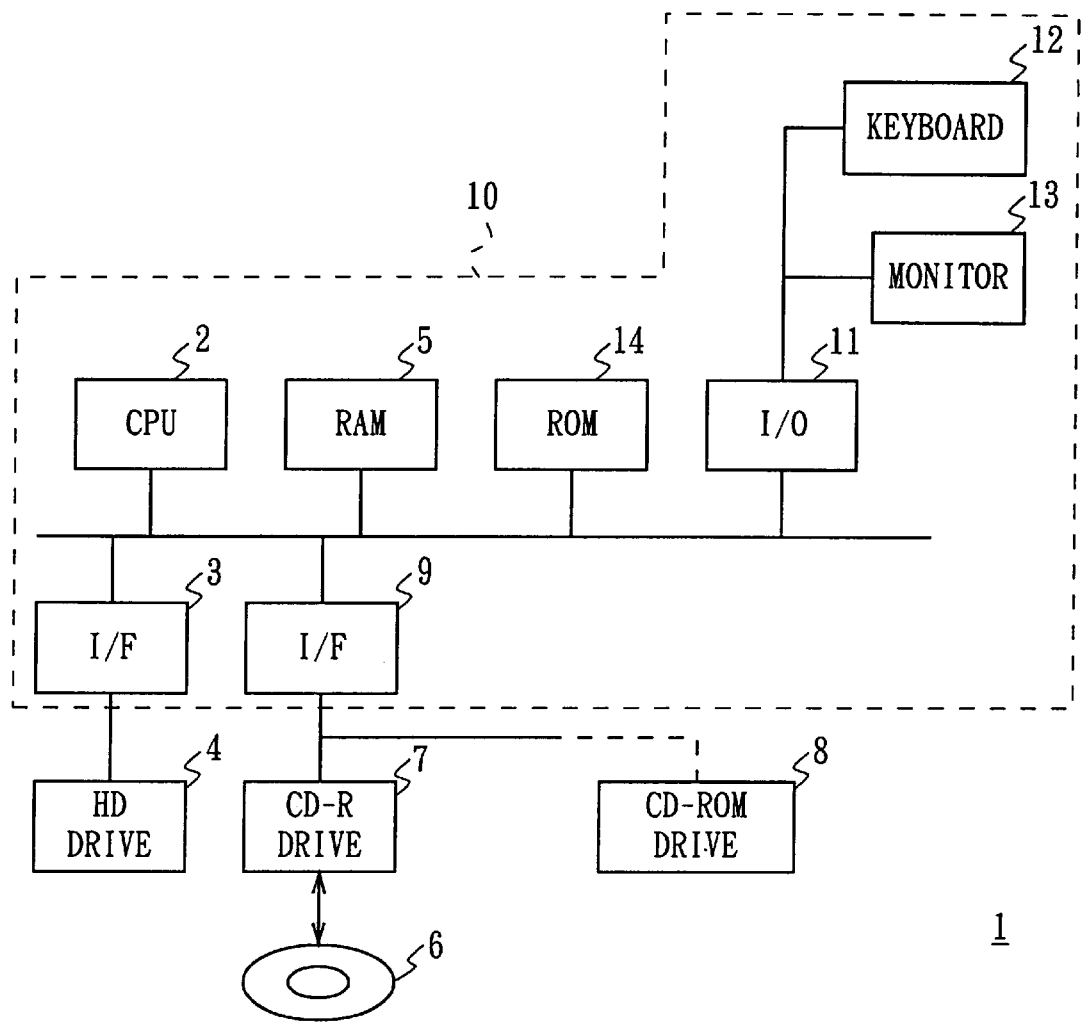
FIG. 6 is a block diagram showing an information processing device according to one embodiment of the present invention.

Preferred embodiment of the present invention will be described with reference to the accompanying drawings:

In FIG. 6, 1 generally shows an information processing device and in a host computer unit 10, the command by the user is entered into a CPU 2 via an I/O (input/output) 11 when the user operates the input device such as a keyboard 12 and the necessary data will be supplied to the display screen of a monitor 13.

OS program stored in the hard disc will be read from a hard disc drive 4 through an interface 3 by the control of CPU 2 and stored in a RAM 5. The CPU 2 reads or writes data from/to the disc driven by the CD-ROM drive device 8 or CD-R drive device 7 based on this OS program.

Figure 7:
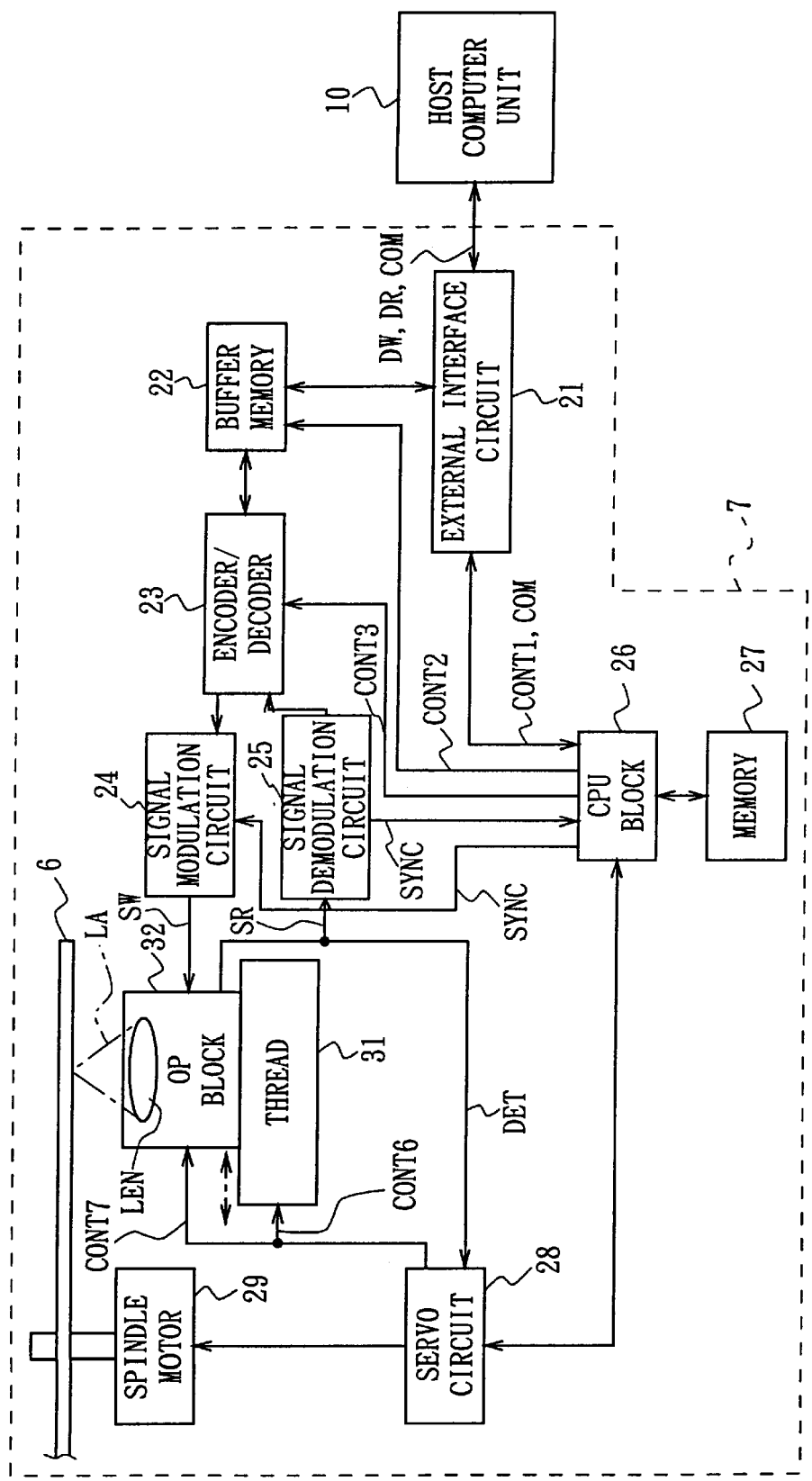
FIG. 7 is a block diagram showing the construction of a CD-R drive device.

As shown in FIG. 7, in the host computer unit 10 (FIG. 6), the CD-R drive device 7 supplies the write data DW sent out from the RAM 5 by the control of the CPU 2 with the write command COM to an external interface circuit 21. The CPU block 26 sends out write data DW to the buffer memory 22 by controlling the external interface circuit 21 according to the write command COM. The buffer memory 22 is controlled by control signal CONT2 to be put out from the CPU block 26, and after collecting at least 1 packet of write data DW (in this embodiment, collecting 32 blocks, each block having 2 makes one packet), supplies this to the encoder 23. The encoder 23 is controlled by the control signal CONT3 to be sent out from the CPU block 26 and executing the CIRC (cross interleaved Reed-Solomon code) encoding that combines Reed-Solomon code to a packet of write data DW sent out from the buffer memory 22, conducts error compensation at the recording time to the CD-R disc 6.

Thus, the write data DW error compensated is sent out to a signal modulation circuit 24 and EFM modulation is conducted (8–14 modulation), and sync signal SYNC to be sent out from the CPU block 26 is added and sent out to an optical block 32 at the timing corresponding to the sync signal SYNC.

The optical block 32 sends out servo detection signal DET (tracking error signal, focus error signal) to be obtained by reproducing the CD-R disc 6 to a servo circuit 28. The servo circuit 28 controls a spindle motor 29 to the prescribed number of revolutions based on the servo detection signal DET. Moreover, the servo circuit 28 finely adjusts the position of the optical block 32 by sending out the control signal CONT6 to a thread 31 based on the servo detection signal DET and using said thread 31, and simultaneously, by sending out the control signal CONT7 to the optical block 32, adjusts the position of said optical block 32 finely.

Thus, the record signal SW to be supplied from the signal modulation circuit 24 through an optical system LEN of the optical block 32 positioned on the predetermined position will be written on the predetermined position of the recording surface of the CD-R disc 6 by the laser beam LA.

On the other hand, in the case of reading the data already recorded from the CD-R disc 6, reproduction signal SR obtained via the optical block 32 will be supplied to the signal demodulation circuit 25. The signal demodulation circuit 25, as well as conducting the EFM demodulation to the reproduction signal SR, detects sync signal SYNC from said reproduction signal SR and sends this out to the CPU block 26.

The reproduction signal EFM demodulated at the signal demodulation circuit 25 is transmitted to a decoder 23 and conducted error correction by the CIRC decoder. Thus, read data DR will be obtained at the decoder 23 and this is sent out to the host computer unit 10 through the buffer memory 22 and the external interface circuit 21. In this connection, a memory 27 of the CD-R drive device 7 is a working memory to operate the CPU block 26.

Figure 8:
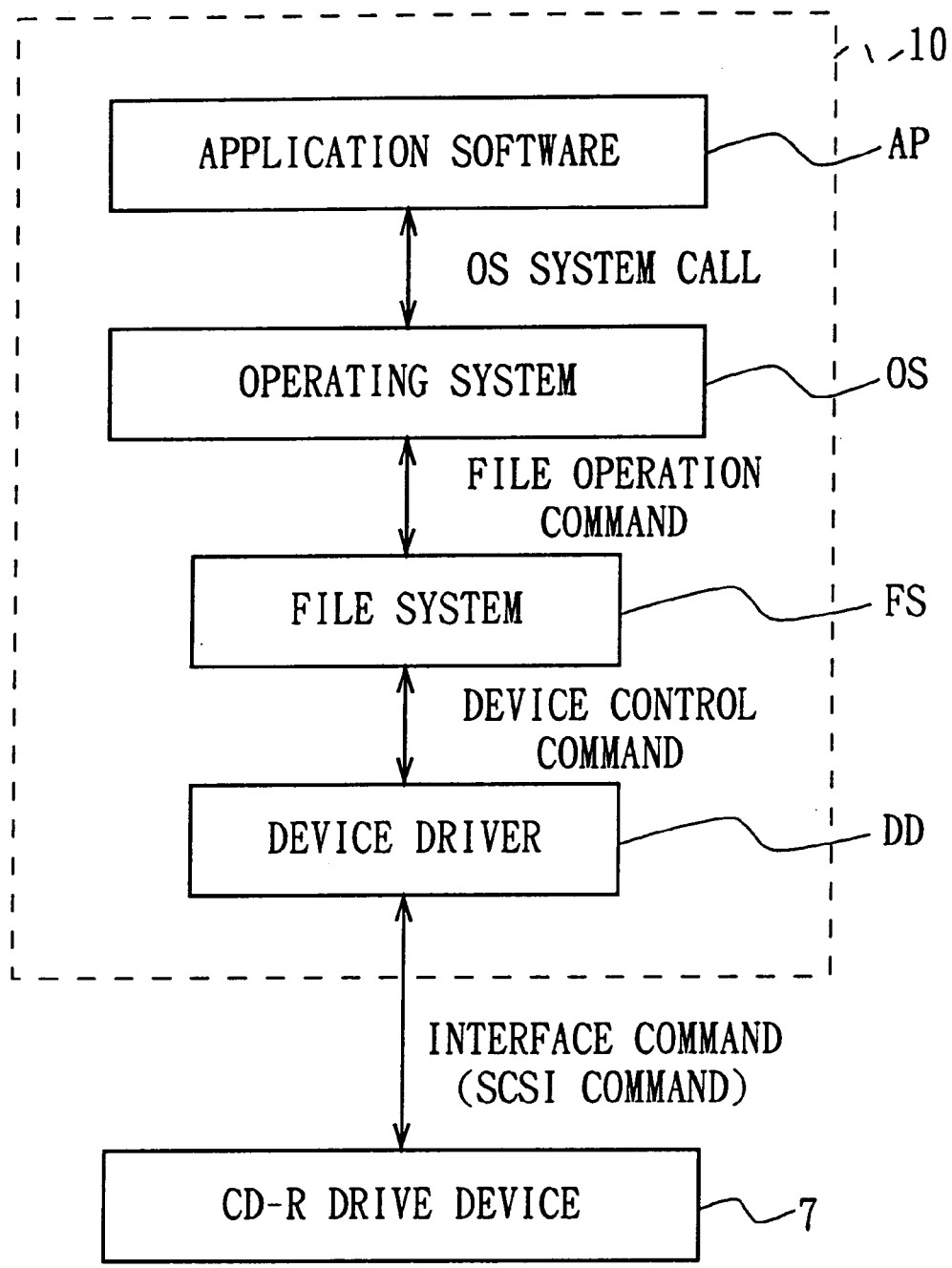
FIG. 8 is a block diagram showing a packet recording system.

FIG. 8 shows a software system for packet recording in the host computer unit 10 and the CD-R drive device 7. And when the user instructs to write file or erase file to the application software AP, the application software AP converts the command by the user to the system call of the operating system OS and sends this out to the operating system OS. When the operating system OS receives the system call, it delivers a file operation command to the file system (CDRFS: compact disc recordable file system) corresponding to the CD-R drive device 7.

The file system FS interprets the file operation command delivered and judges the write position or read position on the CD-R disc 6 to be driven by the CD-R drive device 7 and hands over the judgment result to the device driver DD as a device control command. The device driver DD converts the device control command to the different commands according to each drive device. In the case of FIG. 8, the device driver DD converts the device control command to the command of the CD-R drive device 7 and sends this out to the CD-R driver device 7 as an interface command of the CD-R driver device. Thus, the CD-R drive device 7 can write or read the desired data according to the instruction of the user.

Figure 9A:
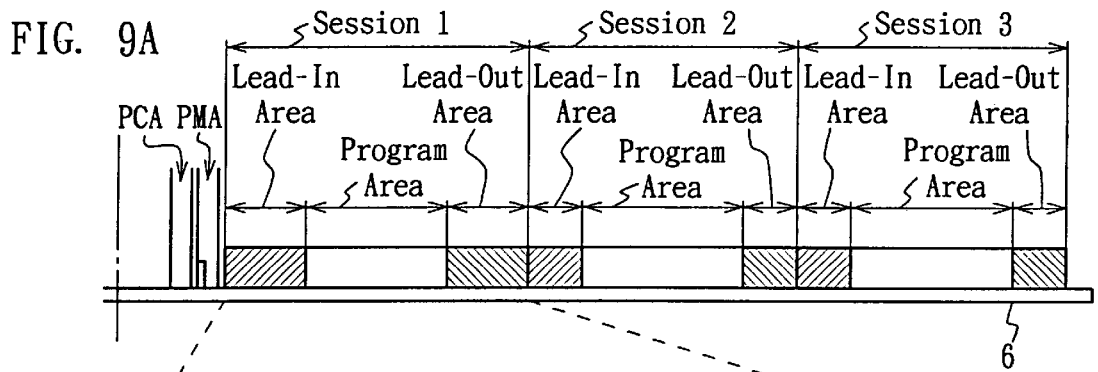
FIGS. 9A to 9D are schematic diagrams showing the logical construction of a CD-R disc.

FIGS. 9A to 9D show the logical construction of multi-session CD-R disc forming multiple sessions, and recording tracks are formed helically from the center of the CD-R disc towards the outer region. As shown in FIG. 9A, this recording track starts from PCA (power calibration area) for searching the optimal power from the disc center towards the outer side and PMA (program memory area) in which TOC (table of contents) information is recorded and multiple sessions to record the program data are provided. After the completion of writing the program area for recording the program data, each session will be closed with the lead-in area and the lead-out area which are guard areas at the head and the end. TOC is set in the lead-in area and the head position information of the latest session added can be obtained.

Figure 9B:
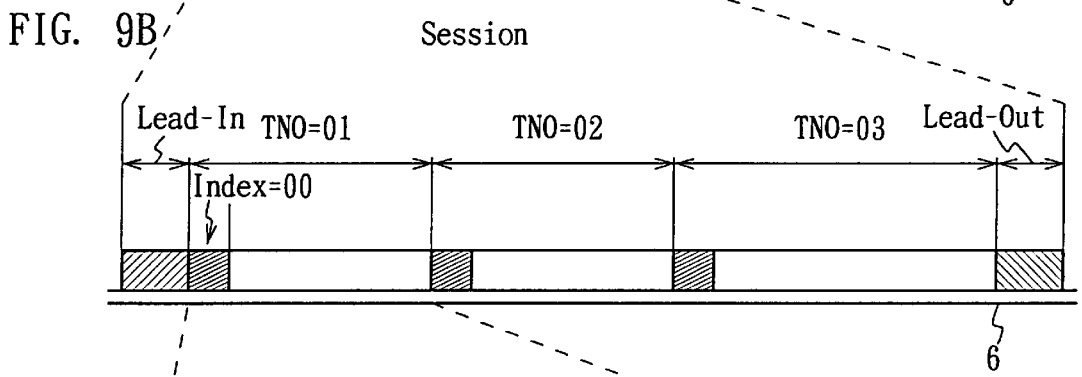
Figure 9C:
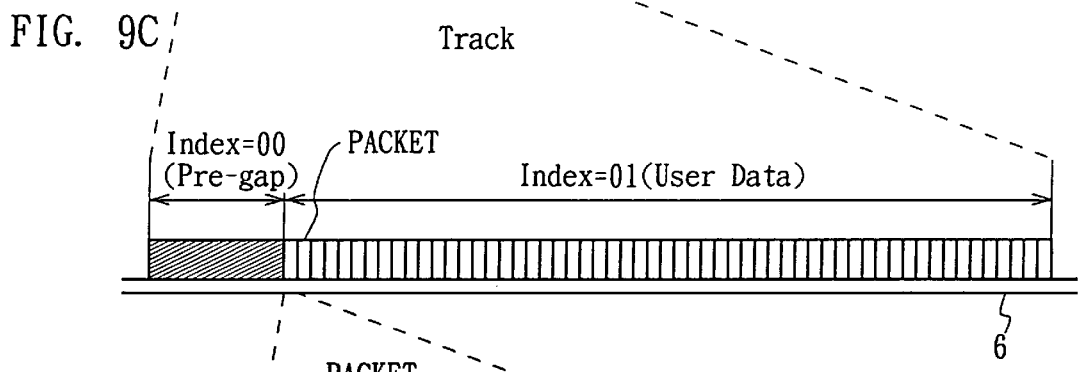

FIG. 9B shows that each session is formed by 3 tracks in the case where each session has 3 data tracks for example. As shown in FIG. 9C, each track is formed by fixed length multiple packets to be set following the index=00 which sets track descriptor. Moreover, as shown in FIG. 9D, in the case where each packet has the fixed length 32, the user data of packet length 32 will be recorded between the link block (LB), the run-in-block (RI) and the run-out-block (RO).

In this connection, in the logical construction shown in FIGS. 9A to 9D, in the case of reading the record data of the CD-R disc 6 by the CD-ROM drive 8 (FIG. 6), by forming the lead-in-area and the lead-out-area at the head and the end of each session, the read only CD-ROM file system can recognize the program area between the lead-in-area and lead-out-area of said disc as one session.

On the other hand, in the case of writing or reading the data for the CD-R disc by using the file system CDRFS which writes or reads data to/from the recordable type CD-R disc, since data will be recorded successively to the session before completion, if the lead-in-area and lead-out-area which will be recorded after the completion of session program area are not yet formed but in process of being formed (recorded on a packet-by-packet basis), these can be accessed per packet.

Figure 9D:
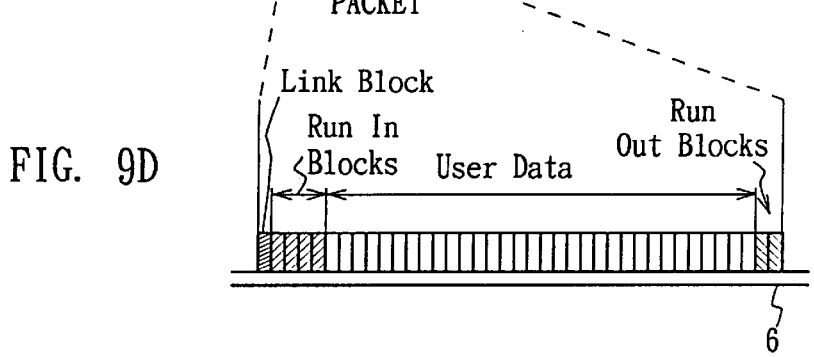
Figure 10:
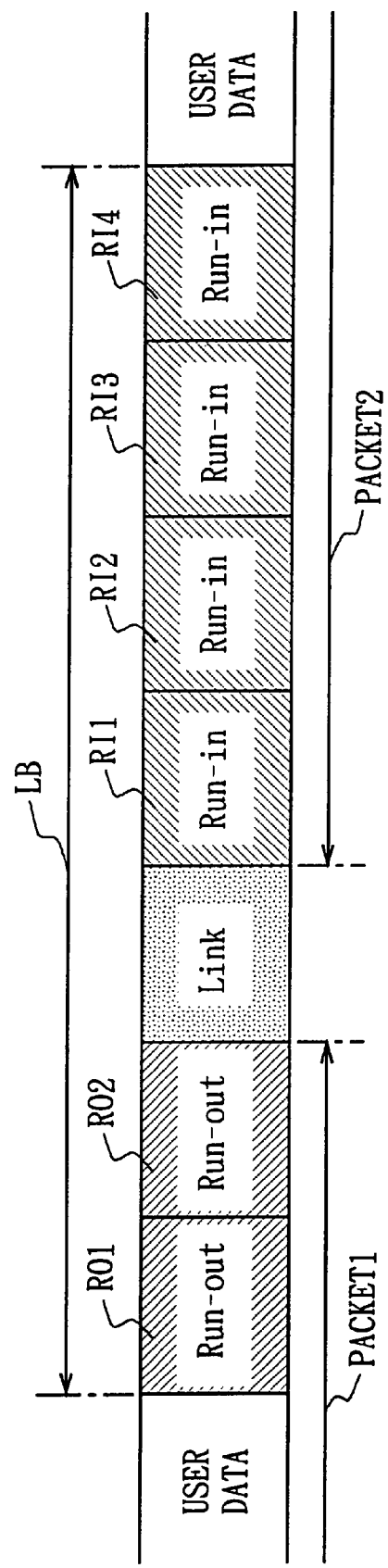
FIG. 10 is a schematic diagram showing the construction of the link block unit.
Figure 11:
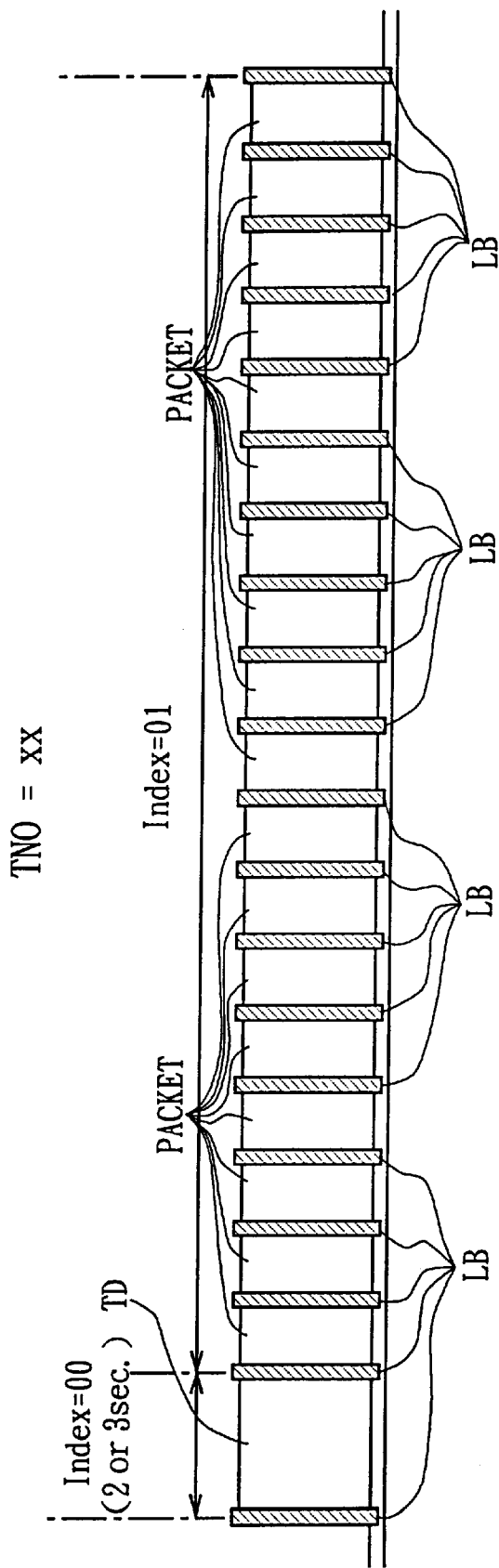
FIG. 11 is a schematic diagram showing the write condition of the fixed length packet.

FIG. 10 shows the detailed construction of link unit of each packet shown in FIG. 9D, and link block is provided between two 2 run-out-blocks RO1 and RO2 provided at the end of the first packet PACKET 1 and 4 run-in-blocks R11, R12, R13 and R14 provided at the beginning of the second packet PACKET 2. Thus, as shown in FIG. 11, one data track is formed by connecting each packet of the fixed length with the link block LB. At the head of this data track, said data is formed by the fixed length packet and the number of blocks for forming each packet (packet size information) will be recorded as the track descriptor (TD).

At this point, the file system CDRFS of the host computer unit 10, by alternately using 2 buffer areas (the first buffer BUF1 and the second buffer BUF2) provided in the RAM 5, holds the data until the completion of actual data writing of one side packet.

Figure 1:
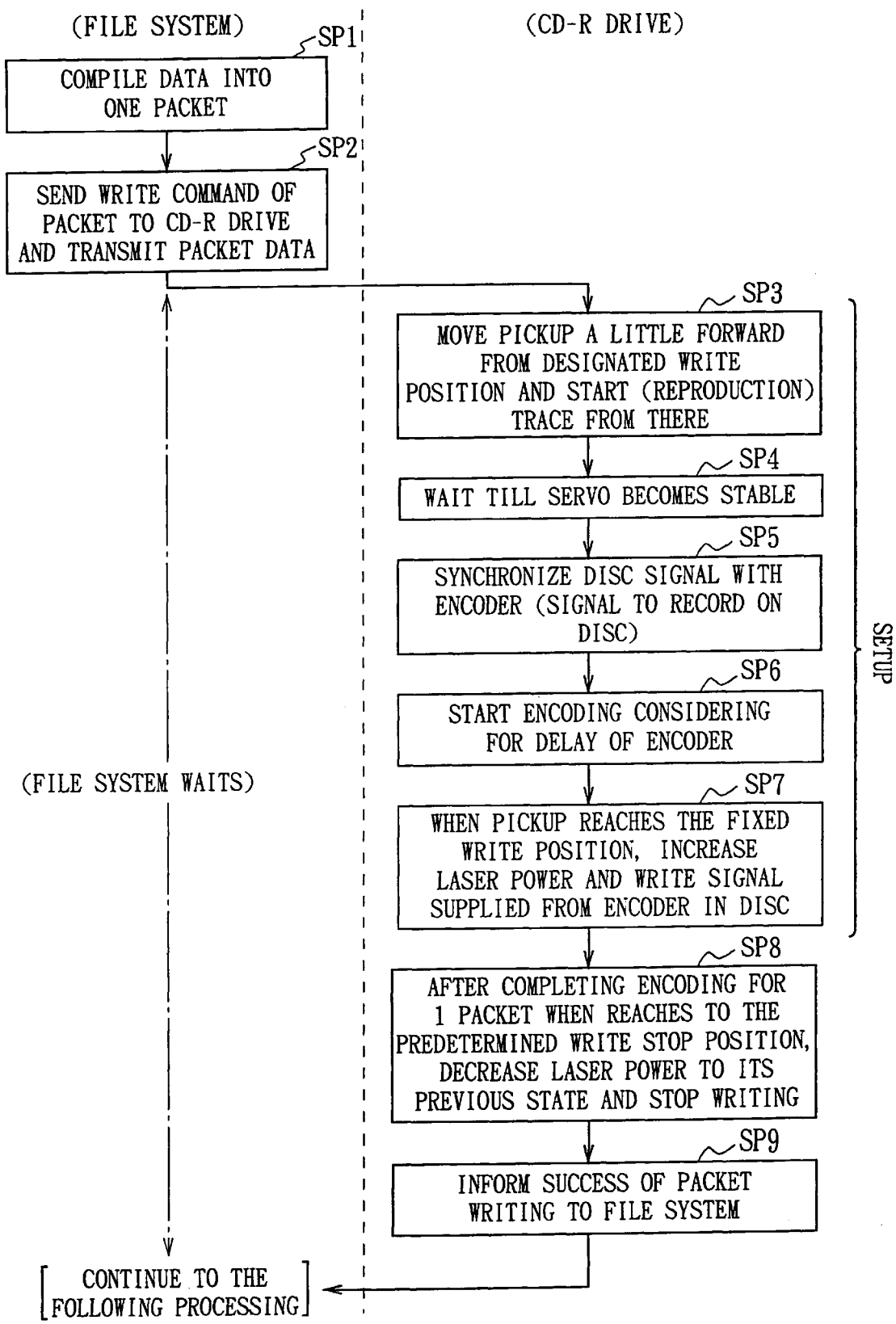
FIG. 1 is a flow chart showing the write operation for conventional one packet.
Figure 2:
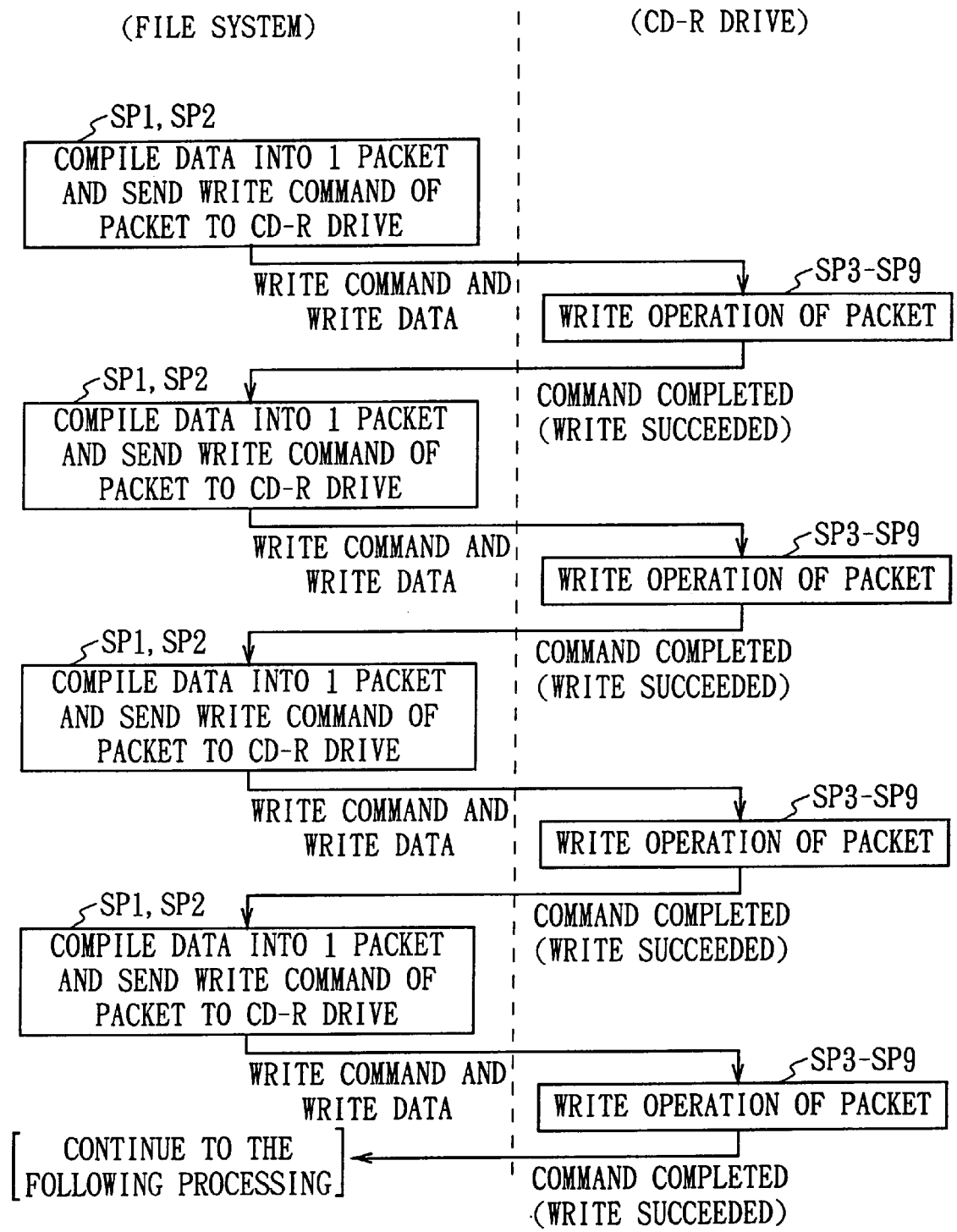
FIG. 2 is a flow chart illustrating the conventional write operation.
Figure 12:
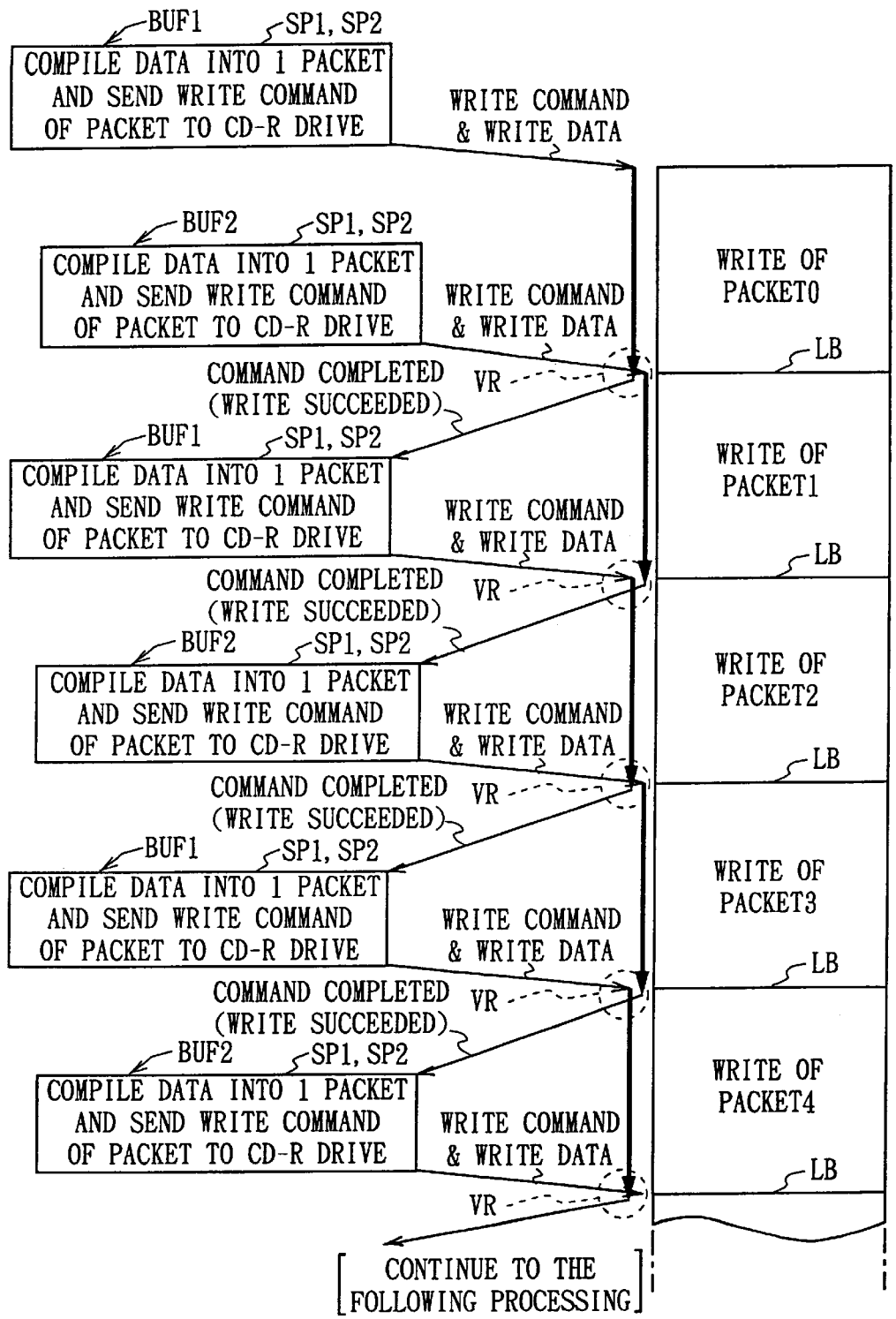
FIG. 12 is a timing chart showing the write operation of the embodiment.

More specifically, FIG. 12, in which corresponding parts of FIG. 1 are designated the same reference numerals, shows the processing to record each packet sequentially on the CD-R disc 6 by storing the continuous packets (PACKET0, PACKET1, PACKET2, . . . ) alternately in the buffer BUF1 and BUF2, and the file system side (i.e., host computer 10 side) compiles write data for one packet in the first buffer BUF1, and sends out the write command and write data of the packet PACKET0 to the CD-R drive device 7 as the first packet PACKET0. The CD-R drive device 7 writes the data of the first packet PACKET0 on new write position based on the write command.

On the other hand, the second buffer BUF2 of the file system (host computer 10 side) compiles write data succeeding the first packet into one packet and making this as the second packet PACKET1, sends out the write command and write data of said second packet PACKET1 to the CD-R drive device 7. The CD-R drive device 7 writes the write data of the second packet PACKET1 continuously from the first packet PACKET0 on the basis of write command of said second packet PACKET1 in the CD-R disc 6. At this point, link block unit LB described above in FIG. 10, will be formed between the first packet PACKET0 and the second packet PACKET1.

When the writing of write data of the first packet PACKET0 is completed, the file system side compiles the write data of the third packet PACKET2 following the second packet PACKET1 into one packet and making this as the third packet PACKET2, sends out the write command and the write data of the third packet PACKET2 to the CD-R drive device 7. The CD-R drive device 7 writes the write data of said third packet PACKET2 continuing from the second packet PACKET1 in the CD-R disc 6. At this point, the link block LB is formed between the second packet PACKET1 and the third packet PACKET2.

Figure 13A:
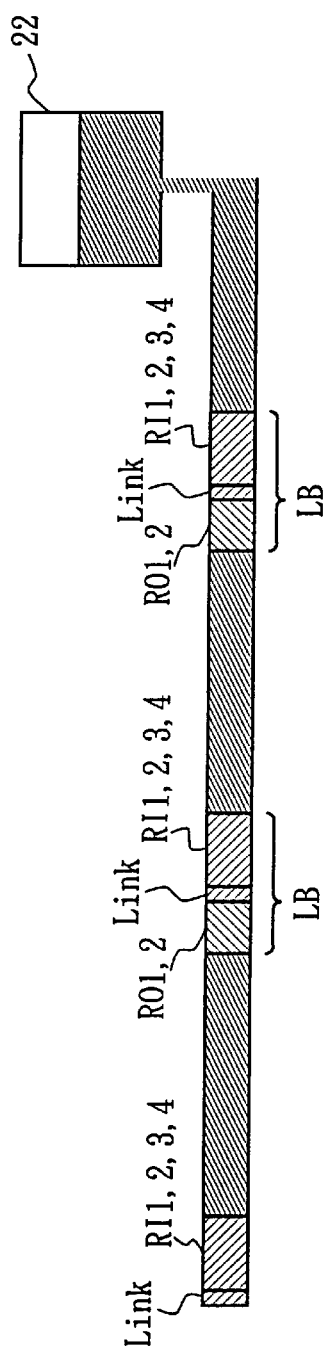
FIGS. 13A and 13B are schematic diagrams illustrating sequential writing of multiple packets.

With this arrangement, in the first buffer BUF1, data of the first packet PACKET0, the third packet PACKET2, the fifth packet PACKET4, . . . are processed. The second buffer BUF2, while processing data of the second packet PACKET1, the fourth packet PACKET3, the sixth packet PACKET5, . . . sends out one packet of data alternately to the CD-R drive device 7. As a result, in the CD-R drive device 7, data will be stored on a packet-by-packet basis in the buffer memory 22 (FIG. 7) sequentially , and as shown in FIG. 13A, the CPU block 26 of the CD-R drive device 7 sequentially writes the write data on the CD-R disc 6 by dividing said write data per packet with the link block unit LB as long as the write data exist in the buffer memory 22.

Figure 3:
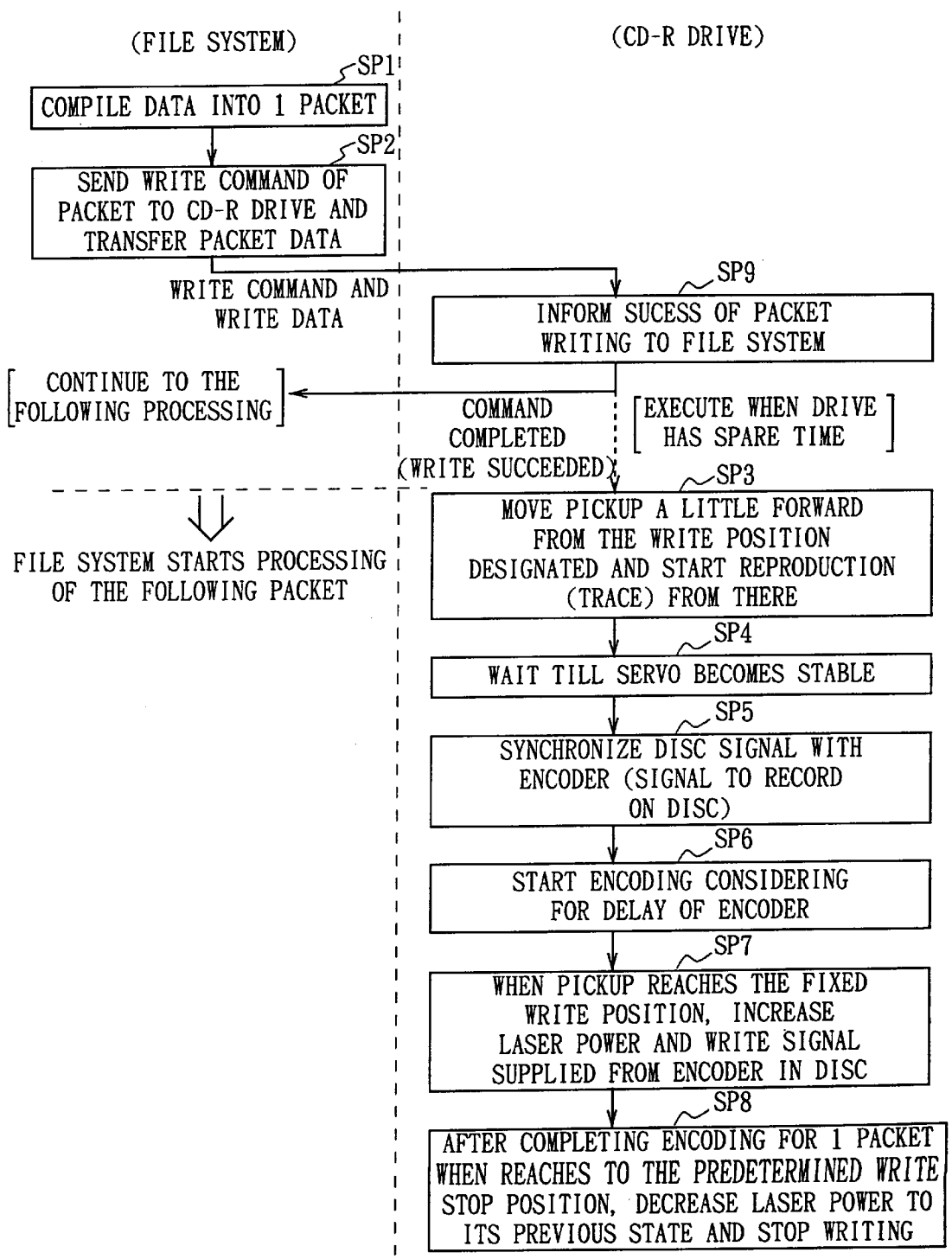
FIG. 3 is a flow chart showing the write operation for one packet using the write cache.
Figure 4A:
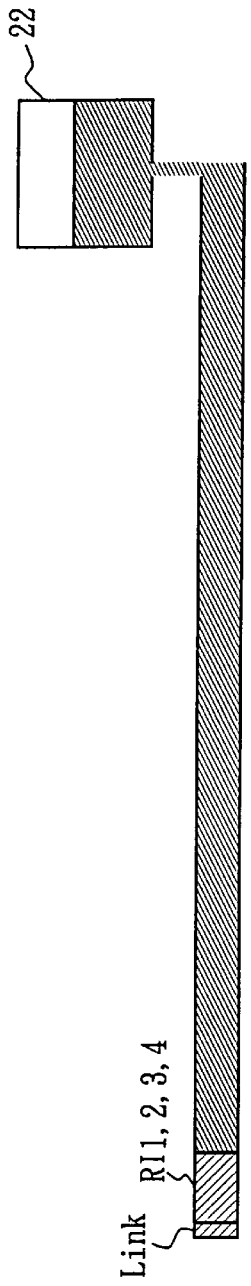
FIGS. 4A and 4B are schematic diagrams illustrating the conventional sequential write operation.
Figure 4B:
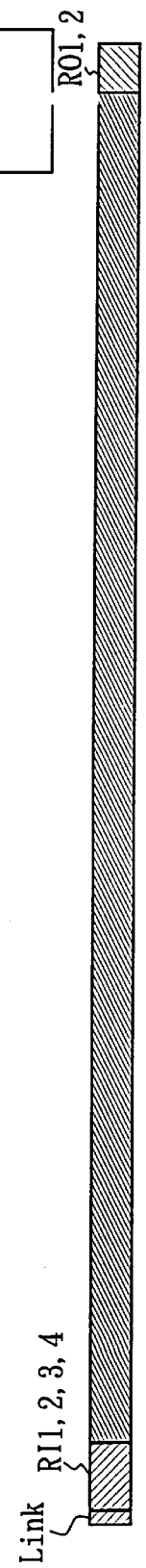
Figure 5:
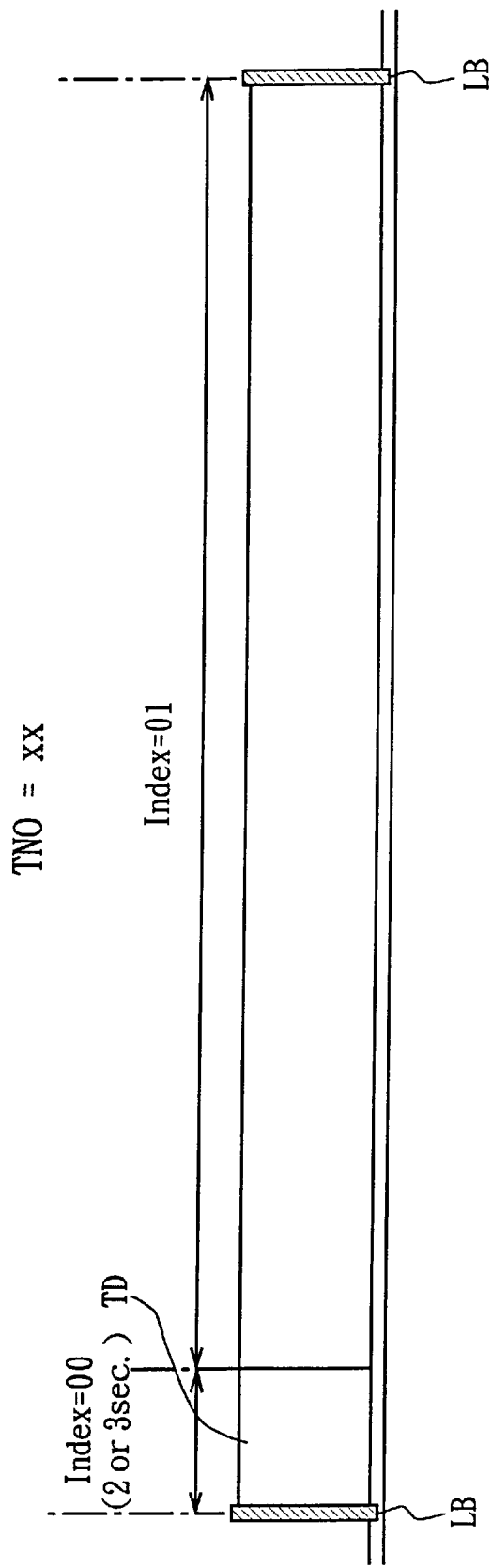
FIG. 5 is a schematic diagram illustrating Track-at-once.

Thus, in the case of writing each packet to be written on the CD-R disc 6, since the succeeding packet is written before the setup processing of steps SP3–SP8 described above in FIG. 3 is conducted, each packet is written sequentially without conducting the setup between each packet. Accordingly, the time required for writing processing can be shortened by said sequential writing.

Figure 13B:
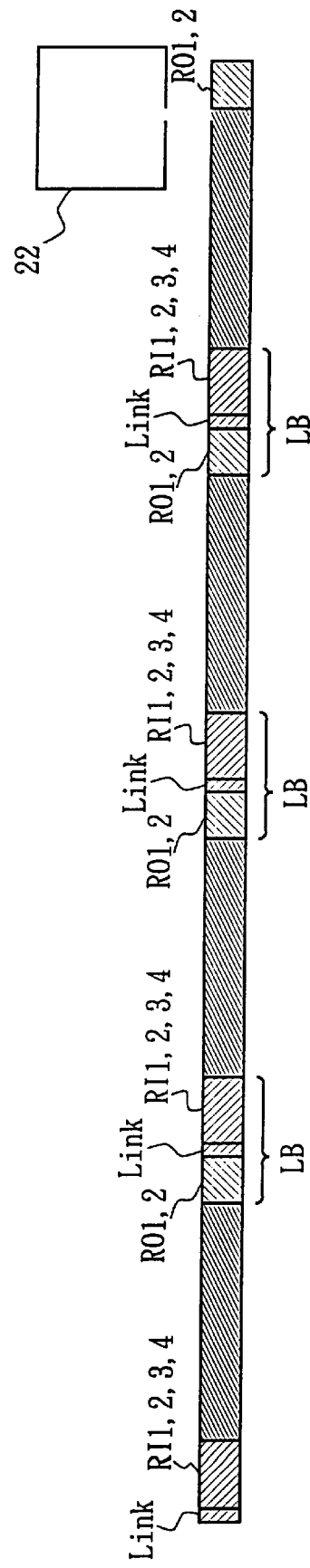

In this connection, as shown in FIG. 13B, when the data in the buffer memory 22 runs out, the CPU block 26 stops to write data on the CD-R disc 6. At this point, the last packet of the CD-R disc 6 is written with runout (RO1, RO2) and is in a state of completion, however, if less than one packet of data remains in the buffer memory 22, the CPU block 26 suspends writing of the following packet until the volume of data in the buffer memory 22 becomes to the data volume for one packet. Thus, on the CD-R disc 6, only packets having the predetermined volume of data will be formed.

At this point, in the write processing using 2 buffers BUF1 and BUF2 (FIG. 12), in the case of writing the data of the second buffer BUF2 sequentially after writing the data for one packet of the first buffer BUF1 on the CD-R disc 6, it is necessary to send out the write command of the data of the second buffer BUF2 (e.g., PACKET1) to the CD-R drive device 7 before the write command of the data of the first buffer BUF1 (e.g., PACKET0) is completed.

Accordingly, in the CD-R drive device 7, overlap unit VR (FIG. 12) in which two write commands overlap each other, occurs. Here, it is difficult to receive two commands at the same time in the SCSI (small computer system interface) through which data are transmitted and/or received between the CD-R drive device 7 and the host computer unit 10, and in the overlap unit VR, the processing to assume two write commands as one command will be conducted.

Figure 14:
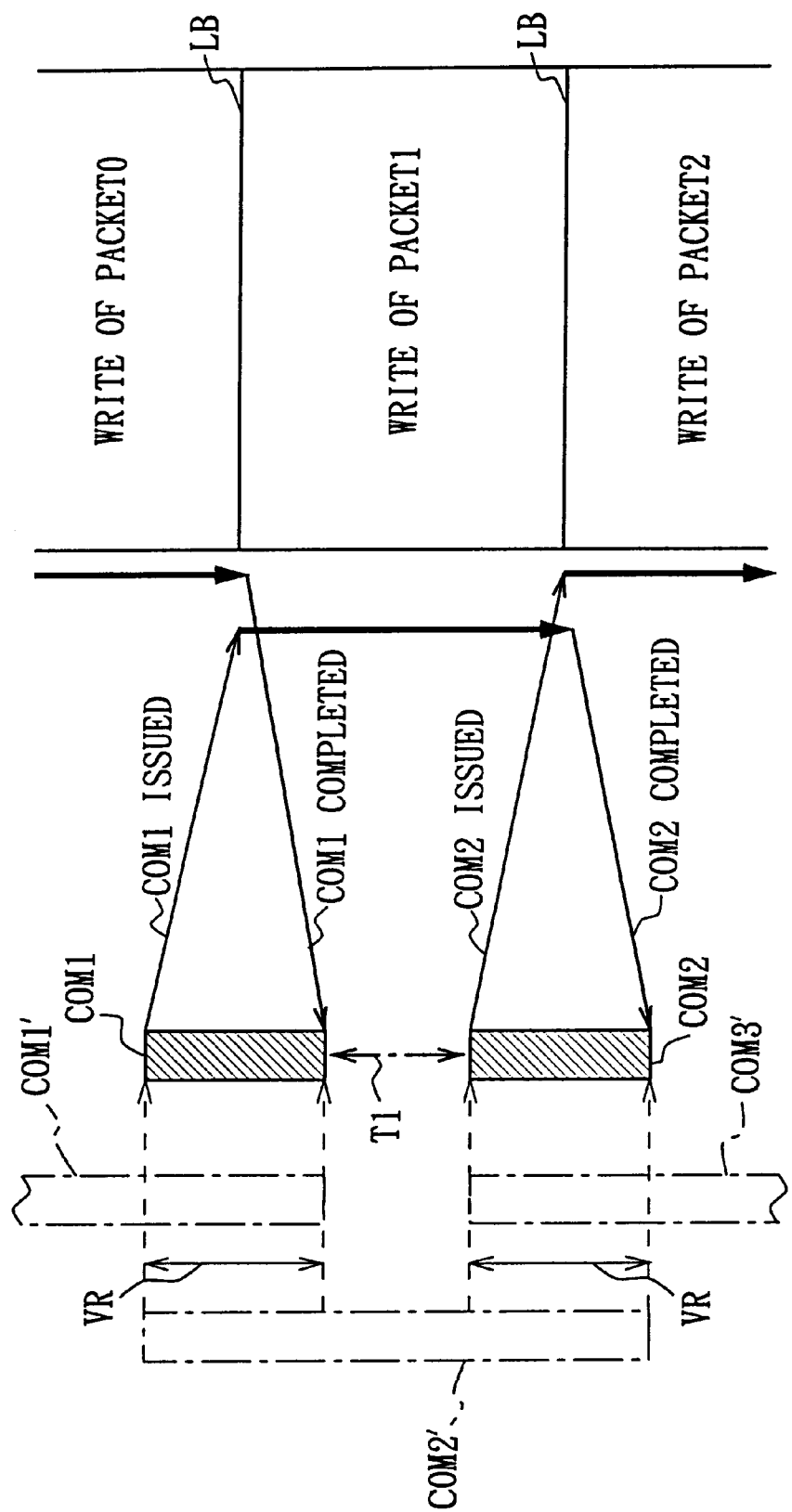
FIG. 14 is a schematic diagram illustrating the common use of write commands.

More specifically, in FIG. 14, the write command COM0' to be transmitted from the CPU 2 of the host computer unit 10 to the CD-R drive device 7 in order to write the write data (PACKET0) in the first buffer BUF1 on the CD-R disc 6 and the write command COM2' to be transmitted to write the succeeding write data (PACKET2) in the first buffer BUF1 overlap with the write command COM1' to be transmitted in order to write the write data (PACKET1) in the second buffer BUF2 on the CD-R disc 6 in the overlap unit VR respectively. Thus, the CPU 2 of the host computer unit 10 sends out the issue of write command COM1' to the CD-R drive device 7 as an actual write command COM1 and writes the write data (PACKET1) in the second buffer BUF2 on the CD-R disc 6 by this write command COM1.

At this point, in the CD-R drive device 7, the command completion of the primary write command COM0' on the write data (PACKET0) of the first buffer BUF1 already completed the writing on the CD-R disc 6 will be returned to the host computer unit 10 (i.e., file system) from the CD-R drive device 7 as the command completion (COM1 completion) of the write data of the second buffer BUF2 (PACKET1) to be starting the writing from now on. Thus, the write command COM1 to write the write data (PACKET1) actually, finishes the command (i.e., before completing writing of the write data PACKET1) according to the write completion of write data PACKET0.

Accordingly, as well as writing the write data on the CD-R disc 6 upon transmitting the write command COM, by returning the write completion of the first write data written before the second write data to the file system side before said second write data writing as the command completion of the second write data (COM completion), pseudo write cache method will be realized and the preparation for the writing of the second write data can be started before completing the writing of the first write data.

Figure 15:
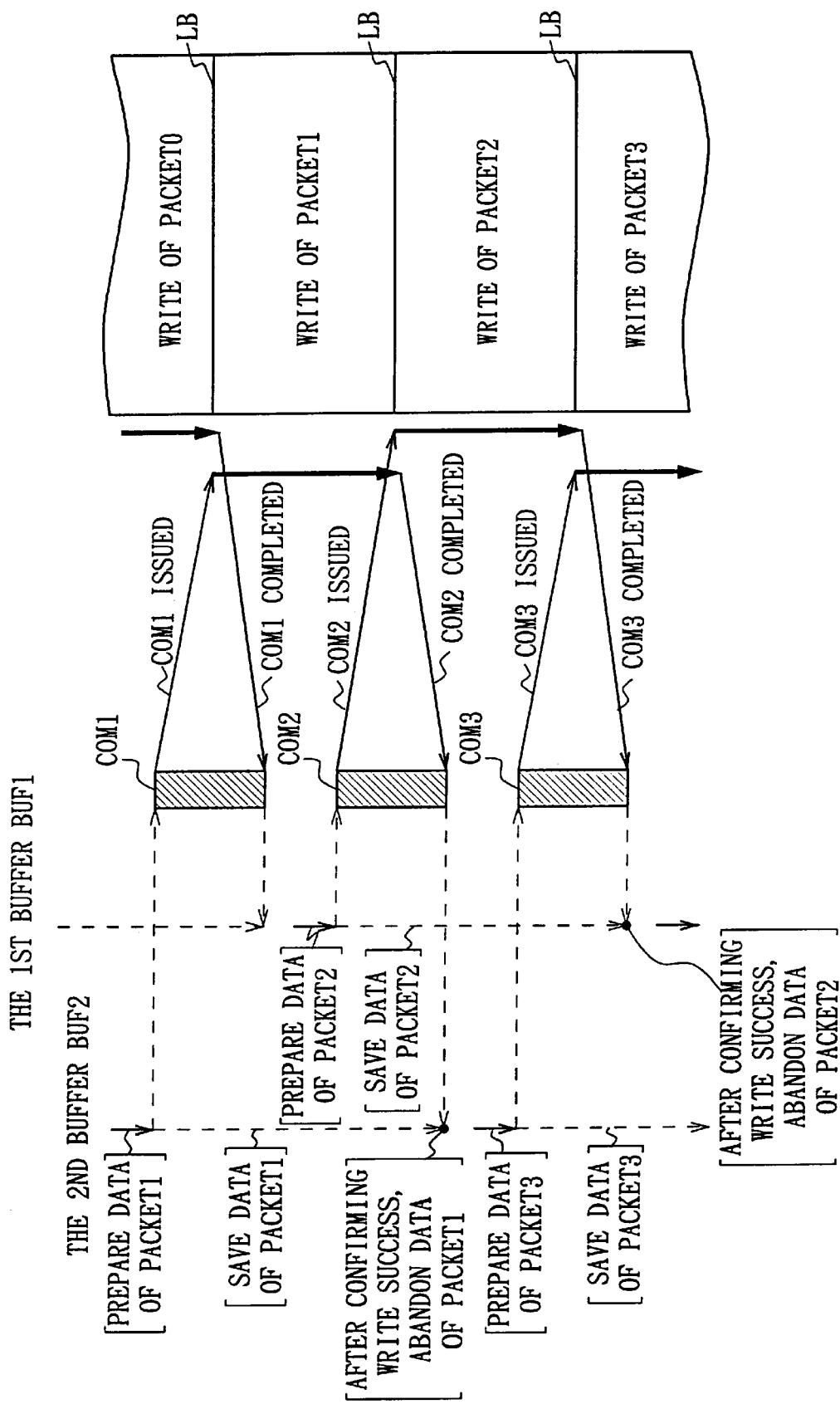
FIG. 15 is a timing chart showing the write processing at the normal time.

In the case of overlap sequence, as shown in FIG. 15, by preparing continuing packets alternately in 2 buffers (buffer BUF1 and BUF2) in the file system (host computer unit 10), at the time when the writing of the write data PACKET1 in the second buffer BUF2 on the CD-R disc 6 is started by the first write command COM1, the file system would not recognize said write command COM1 as the completion of the second buffer BUF2 data writing even though the completion of the write command COM1 has been returned, but the following write data PACKET2 will be prepared in the first buffer BUF1 while saving the write data PACKET1 in the second buffer BUF2.

Accordingly, when the writing of the write data PACKET1 of the second buffer BUF2 is actually completed and the command completion (COM2 completion) of the write command COM2 of the write data PACKET2 of the first buffer BUF1 is returned, the file system recognizes said write command completion (COM2 completion) as the actual write completion of the write data PACKET1 and the second buffer BUF2 abandons the write data PACKET1 being saved at that time and starts the preparation for the following write data PACKET3. Thus, the file system, recognizing the command completion of the second write command COM2 (COM2 completion) to be returned delaying for one command from the command completion of the first write command COM1 (COM1 completion) as the actual write completion of the write data PACKET1, can store said write data PACKET1 in the buffer until the write data PACKET1 is certainly written on the CD-R disc 6.

Figure 16:
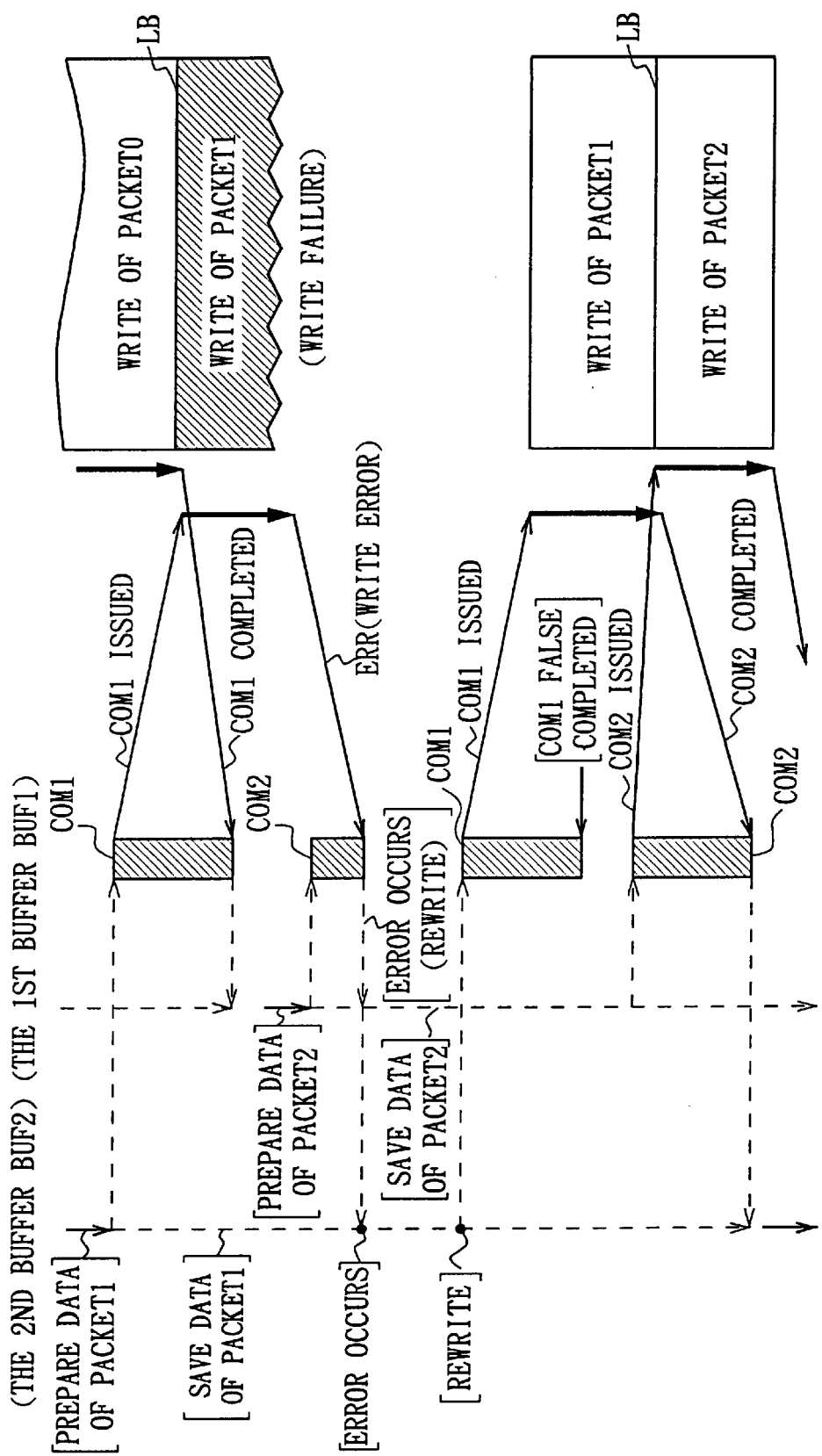
FIG. 16 is a timing chart showing the processing at the time of write error.

Accordingly, as shown in FIG. 16, if the writing of the write data PACKET1 is failed, error information ERR will be sent back to the file system side immediately when said write error occurs. Then, at this point, the write data PACKET1 stored in the second buffer BUF2 is rewritten on the new write position on the CD-R disc 6 by reissuing the write command COM1.

Thus, by preparing and storing sequential packets alternately in utilizing 2 buffers BUF1 and BUF2, if the command completion (i.e., write completion) would be sent back before starting the data writing that is supposed to be written by said write command COM after transmitting the write command COM, recovery at the time of write error becomes possible since the write data in the buffer can be stored as compared with the write cache method using one buffer as described above in FIG. 3.

Figure 17:
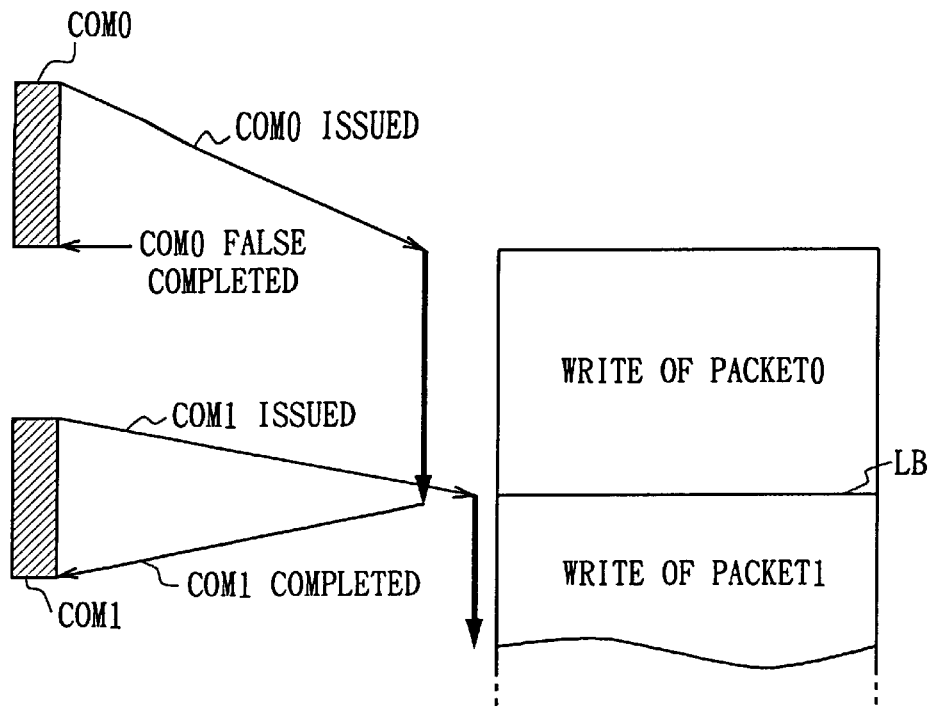
FIG. 17 is a timing chart showing the processing at the time of write starting.

FIG. 17 shows the case of writing the head packet, and the write data PACKET0 prepared at the first buffer BUF1 is written on the CD-R disc 6 by the write command COM0. At this point, since there is no data written before said write data PACKET0, false completion of the command COM0 will be returned from the CD-R drive device 7 to the file system. Thus, the file system starts preparation for the following write data PACKET1 at the second buffer BUF2.

Figure 18:
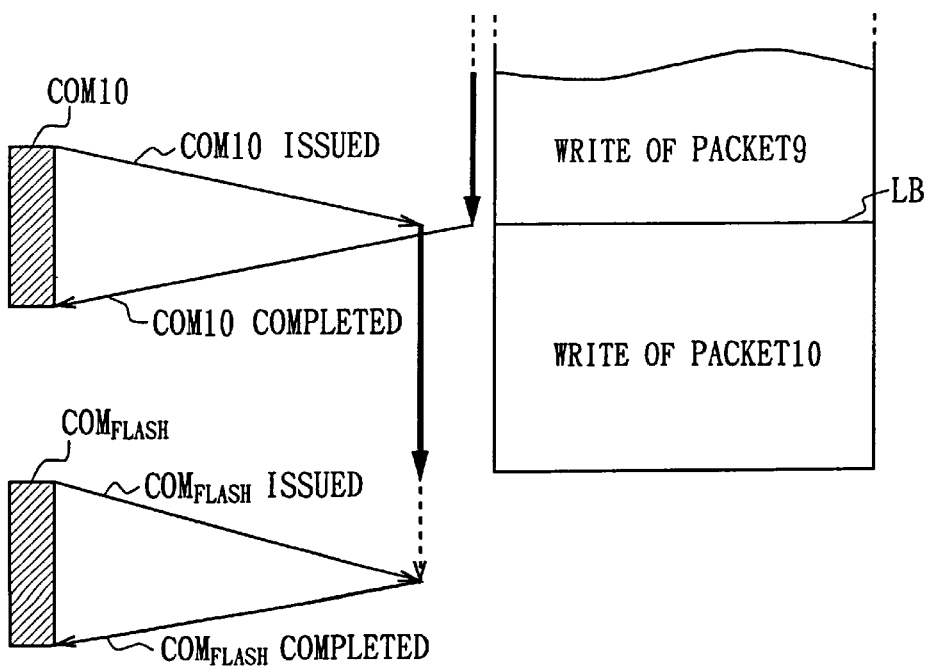
FIG. 18 is a timing chart showing the processing at the time of write completion.

Furthermore, FIG. 18 shows operation at the time of write completion of the last packet. For example, in the case of finishing with the tenth packet, by transmitting flash command $COM_{FLASH}$ showing the completion of overlap sequence from the file system to the CD-R drive device 7 after writing the write data PACKET10 prepared at the first buffer BUF1 of the file system side on the CD-R disc 6 by the write command COM10, all packets writing according to said overlap sequence will be completed with the completion of the flash command $COM_{FLASH}$.

According to the foregoing construction, immediately after the host computer unit 10 sends the write command COM to the CD-R drive device 7 by means of write cache method, the CD-R drive device 7 sends back the command completion to the file system. At this point, as well as holding the data being written on the CD-R disc by the write command COM until the writing is completed on the disc in either one of 2 buffers BUF1 and BUF2 (i.e., delaying for one command), it prepares the following write data in the other buffer based on the completion of command COM to be returned before the data writing on the disc.

With this arrangement, recovery at the time of write error will be possible and at the same time, data are sequentially stored in the buffer memory 22 of the CD-R drive device 7 by using the write cache method. Thus, as long as data exists in the buffer memory 22, data will be written sequentially on the CD-R disc 6 and the setup described above in FIG. 3 (SP3–SP8) can be omitted. At this point, if the volume of data larger than for one packet (32 blocks) is stored in the buffer memory 22, link blocks LB will be forcefully formed per data unit (packet) comprising 32 blocks on the CD-R disc 6, and if the data for one packet does not exist in the buffer memory 22, the data writing would not be started on the CD-R disc 6 until the volume of said store data becomes for one packet.

Thus, the data are formed on the CD-R disc 6 completed by the link blocks LB on the data basis for one packet. Accordingly the occurrence of address shift, i.e., the write position on the CD-R disc 6 shifts corresponding to the data volume of the buffer memory 22, can be prevented, and it makes possible that the write address on the CD-R disc 6 to be controlled by the file system of the host computer unit 10 side agrees completely with the address to be actually written on the CD-R disc 6.

Thus, according to the foregoing construction, the data writing having no address shift can be conducted at high speed enabling the restoration of write error.

Figure 19:
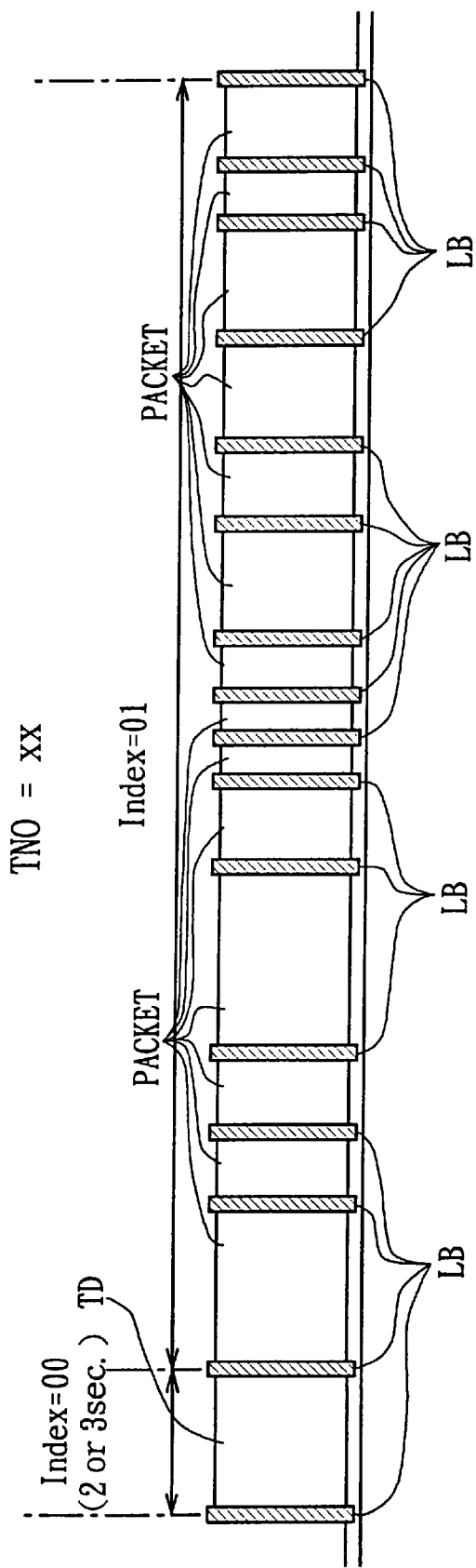
FIG. 19 is a schematic diagram showing the write condition by the variable length packet.

Furthermore, the embodiment described above has dealt with the case of data writing on the CD-R disc 6 per the fixed length packet. However, the present invention is not only limited to this but also it may be written per variable length packet as shown in FIG. 19 for example. In this case, the length of packet to be actually written on the CD-R disc 6 may be controlled in advance in the file system side.

Moreover, the embodiment described above has dealt with the case of writing one packet data by one write command COM. However, the present invention is not only limited to this but also the writing of one packet data may be conducted by more than two write commands.

Furthermore, the embodiment described above has dealt with the system using SCSI. However, the present invention is not only limited to this but also it is applicable to the case using various interfaces.

Furthermore, the embodiment described above has dealt with the case of returning the completion of write command in the CD-R drive device 7 to the file system side depending upon the completion of the preceding write data. However, the present invention is not only limited to this but also the completion of command may be sent back separately from the completion of the preceding data writing.

Moreover, the embodiment described above has dealt with the case of providing two buffer areas (buffer BUF1 and BUF2) in the file system (host computer unit 10). However, the present invention is not only limited to this but also more than 3 buffers may be used. In this case, for example, if 3 buffers are used, the period to store the write data in one buffer would be the period delayed for 2 commands and in case of using 4 buffers, it would be the period delayed for 3 commands.

Moreover, the embodiment described above has dealt with the case of making one packet as 32 blocks. However, the present invention is not only limited to this but also the packet having various number of blocks (data length) can be used.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information recording method for sequentially writing data on a recording medium on a fixed data basis, comprising the steps of:

compiling said data in a first buffer to form a first packet;

generating a first write command to begin writing said first packet on said recording medium, in accordance with said step of compiling said first packet;

compiling said data in a second buffer to form a second packet, before completion of writing said first packet;

generating a second write command to begin writing said second packet, in accordance with said step of compiling said second packet;

generating a completion signal to indicate completion of writing said first packet;

compiling said data in said first buffer to form a third packet in place of said first packet, in accordance with said step of generating said completion signal;

generating an error signal to indicate an error in writing said first packet, before said step of generating said completion signal; and generating again said first write command to begin again writing said first packet, without compiling again said first packet, in accordance with said step of generating said error signal.

2. An information recording method for sequentially writing data on a recording medium on a fixed data basis, comprising the steps of:

compiling said data in a first buffer to form a first packet;

generating a first write command to begin writing said first packet on said recording medium, in accordance with said step of compiling said first packet;

compiling said data in a second buffer to form a second packet, before completion of writing said first packet;

generating a second write command to begin writing said second packet, in accordance with said step of compiling said second packet;

generating a completion signal to indicate completion of writing said first packet;

compiling said data in said first buffer to form a third packet in place of said first packet, in accordance with said step of generating said completion signal;

generating a false completion signal to indicate initiation of writing said first packet, before said step of compiling said data in said second buffer, wherein said first packet is a head packet.

3. An information recording method for sequentially writing data on a recording medium on a fixed data basis, comprising the steps of:

compiling said data in a first buffer to form a first packet;

generating a first write command to begin writing said first packet on said recording medium, in accordance with said step of compiling said first packet;

compiling said data in a second buffer to form a second packet, before completion of writing said first packet;

generating a second write command to begin writing said second packet, in accordance with said step of compiling said second packet;

generating a completion signal to indicate completion of writing said first packet;

compiling said data in said first buffer to form a third packet in place of said first packet, in accordance with said step of generating said completion signal;

generating a flash command to indicate completion of compiling said data, wherein a final write command before said flash command corresponds to writing a final packet; and generating a flash completion signal to indicate completion of writing said final packet, in accordance with said step of generating said flash command.

4. An apparatus for writing data on a magneto-optical disc, comprising:

a writing circuit configured to write information on a magneto-optical disc;

a memory circuit configured to store at least one packet of compiled data; and a processor, coupled to said writing circuit and said memory circuit, said processor configured as follows:

to receive a first write command and in accordance therewith control said writing circuit to begin writing a first packet in said memory circuit;

to receive a second write command and in accordance therewith control said writing circuit to begin writing a second packet in said memory circuit;

to generate a completion signal indicating completion of writing said first packet, in accordance with receiving said second write command;

to generate an error signal indicating an error in writing said first packet, before generating said completion signal; and to control again said writing circuit to begin writing said first packet, without receiving again said first write command, in accordance with generating said error signal.

5. An apparatus for writing data on a magneto-optical disc, comprising:

a writing circuit configured to write information on a magneto-optical disc;

a memory circuit configured to store at least one packet of compiled data; and a processor, coupled to said writing circuit and said memory circuit, said processor configured as follows:

to receive a first write command and in accordance therewith control said writing circuit to begin writing a first packet in said memory circuit;

to receive a second write command and in accordance therewith control said writing circuit to begin writing a second packet in said memory circuit;

to generate a completion signal indicating completion of writing said first packet, in accordance with receiving said second write command; and to generate a false completion signal indicating initiation of writing said first packet, before receiving said second write command, wherein said first packet is a head packet.

6. An apparatus for writing data on a magneto-optical disc, comprising:

a writing circuit configured to write information on a magneto-optical disc;

a memory circuit configured to store at least one packet of compiled data; and a processor, coupled to said writing circuit and said memory circuit, said processor configured as follows:

to receive a first write command and in accordance therewith control said writing circuit to begin writing a first packet in said memory circuit;

to receive a second write command and in accordance therewith control said writing circuit to begin writing a second packet in said memory circuit;

to generate a completion signal indicating completion of writing said first packet, in accordance with receiving said second write command;

to receive a flash command indicating an absence of packets to be written on said magneto-optical disc, wherein a final write command received before said flash command corresponds to writing a final packet; and to generate a flash completion signal indicating completion of writing said final packet, in accordance with receiving said flash command.

7. An apparatus for generating packets of data to send to a magneto-optical recording device, comprising:

a storage circuit including a first buffer and a second buffer; and a processor, coupled to said storage circuit, said processor configured as follows:

to compile data to form a first packet and in accordance therewith control said storage circuit to store said first packet in said first buffer;

to generate a first write command and in accordance therewith transmit said first packet to a magneto-optical recording device;

to compile said data to form a second packet and in accordance therewith control said storage circuit to store said second packet in said second buffer;

to generate a second write command and in accordance therewith transmit said second packet to said magneto-optical recording device;

to receive a completion signal indicating completion of writing said first packet, after generating said second write command;

to compile said data to form a third packet and in accordance therewith control said storage circuit to store said third packet in said first buffer, in accordance with receiving said completion signal;

to receive an error signal indicating an error in writing said first packet, before receiving said completion signal; and to generate again said first write command and in accordance therewith transmit again said first packet to said magneto-optical recording device, without compiling again said first packet, in accordance with receiving said error signal.

8. An apparatus for generating packets of data to send to a magneto-optical recording device, comprising:

a storage circuit including a first buffer and a second buffer; and a processor, coupled to said storage circuit said processor configured as follows:

to compile data to form a first packet and in accordance therewith control said storage circuit to store said first packet in said first buffer;

to generate a first write command and in accordance therewith transmit said first packet to a magneto-optical recording device;

to compile said data to form a second packet and in accordance therewith control said storage circuit to store said second packet in said second buffer;

to generate a second write command and in accordance therewith transmit said second packet to said magneto-optical recording device;

to receive a completion signal indicating completion of writing said first packet, after generating said second write command;

to compile said data to form a third packet and in accordance therewith control said storage circuit to store said third packet in said first buffer, in accordance with receiving said completion signal; and to receive a false completion signal indicating initiation of writing said first packet, before compiling said data to form said second packet, wherein said first packet is a head packet.

9. An apparatus for generating packets of data to send to a magneto-optical recording device, comprising:

a storage circuit including a first buffer and a second buffer; and a processor, coupled to said storage circuit, said processor configured as follows:

to compile data to form a first packet and in accordance therewith control said storage circuit to store said first packet in said first buffer;

to generate a first write command and in accordance therewith transmit said first packet to a magneto-optical recording device;

to compile said data to form a second packet and in accordance therewith control said storage circuit to store said second packet in said second buffer;

to generate a second write command and in accordance therewith transmit said second packet to said magneto-optical recording device;

to receive a completion signal indicating completion of writing said first packet, after generating said second write command;

to compile said data to form a third packet and in accordance therewith control said storage circuit to store said third packet in said first buffer, in accordance with receiving said completion signal;

to generate a flash command indicating completion of compiling said data, wherein a final write command before said flash command corresponds to writing a final packet; and to receive a flash completion signal indicating completion of writing said final packet, in accordance with generating said flash command.

* * * * *